(12) United States Patent
Dasgupta

(10) Patent No.: US 9,461,852 B2
(45) Date of Patent: Oct. 4, 2016

(54) SIGNAL DEMODULATION APPARATUS AND SIGNAL DEMODULATION METHOD

(71) Applicant: MediaTek Singapore Pte. Ltd., Singapore (SG)

(72) Inventor: Uday Dasgupta, Singapore (SG)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 14/803,131

(22) Filed: Jul. 20, 2015

(65) Prior Publication Data

US 2016/0149736 A1 May 26, 2016

Related U.S. Application Data

(60) Provisional application No. 62/082,556, filed on Nov. 20, 2014.

(51) Int. Cl.
*H04B 5/00* (2006.01)
*H04L 27/06* (2006.01)

(52) U.S. Cl.
CPC .......... *H04L 27/06* (2013.01); *H04B 5/0031* (2013.01)

(58) Field of Classification Search
CPC ........ H04B 1/16; H04B 5/00; H04B 5/0056; H04B 5/0062; H04B 5/0068; H03D 1/00; H03D 3/00
See application file for complete search history.

(56) References Cited

U.S. PATENT DOCUMENTS 5,214,409 A * 5/1993 Beigel ................. A01K 11/006
340/10.34

2009/0296953 A1* 12/2009 Sakata ................. G10H 1/0008
381/80
2010/0039227 A1 2/2010 Bae
2010/0310012 A1* 12/2010 Hsu ........................ H04L 27/14
375/324

FOREIGN PATENT DOCUMENTS

EP 2 280 488 A1 2/2011

OTHER PUBLICATIONS

Mario Mendizabal, Low Power Demodulator Design for RFID Applications, University of Windsor Scholarship at UWindsor, 2012, XP055258725.
Basavaraj P. M. et al., Design of Low Power ASK CMOS Demodulator Circuits for passive Ultra High Frequency Tag, International Journal of Future Computer and Communication, vol. 1, No. 4, Dec. 2012, pp. 369-371, XP055259274.
Fei Yuan, Design techniques for ASK demodulators of passive wireless microsystems: a state-of-the-art review, Analog Integr Circ Sig Process (2010) 63:33-45 DOI 10.1007/s10470-009-9379-6, Sep. 16, 2009, pp. 33-45, XP019786416, Springer Science+Business Media, LLC 2009.

* cited by examiner

*Primary Examiner* — Nguyen Vo
(74) *Attorney, Agent, or Firm* — Winston Hsu; Scott Margo

(57) ABSTRACT

A signal demodulation apparatus includes: a clock generation device arranged to generate a clock signal according to an inputting modulation signal; and a demodulation device arranged to demodulate the inputting modulation signal to generate a demodulation signal according to the clock signal; wherein a signal edge of the clock signal substantially aligns to a turning point of the inputting modulation signal.

23 Claims, 11 Drawing Sheets

SIGNAL DEMODULATION APPARATUS AND SIGNAL DEMODULATION METHOD

CROSS REFERENCE TO RELATED APPLICATIONS

This application claims the benefit of U.S. Provisional Application No. 62/082,556, filed on Nov. 20, 2014, which is incorporated by reference in its entirety.

BACKGROUND

The present invention relates to a signal demodulation apparatus and related method, and more particularly to an analog NFC signal demodulator and related method.

Short-range, standards-based contactless connectivity technology such as Near field communication (NFC) uses magnetic field induction to enable communication between electronic devices in close proximity. Based on RFID technology, NFC provides a medium for the identification protocols that validates secure data transfer. The signal of the NFC is modulated by ASK (Amplitude shift keying) modulation. To receive the data of the NFC signal correctly, the envelope of the NFC signal should first be extracted. In other words, the rising edge and the falling edge of the envelope of the NFC signal should be precisely detected in order to correctly demodulate the data of the NFC signal. Conventionally, a digital demodulation scheme is always used to demodulate the NFC signal because the digital demodulation scheme can easily handle various modulation schemes of the NFC signal. However, the digital demodulation scheme is expensive in terms of die. This is because at least one high resolution analog-to-digital converter must be used to convert the receiving signal into the digital signal, and the analog-to-digital converter always occupies a large area of the die. Moreover, the large power consumption of the analog-to-digital converter can be another drawback of prior art. Therefore, providing a simplified, low cost, and low power demodulation scheme to detect the envelope of the NFC signal is an urgent problem in the NFC field.

SUMMARY

One of the objectives of the present embodiments is to provide an analog NFC signal demodulator and related method.

According to a first embodiment, a signal demodulation apparatus is disclosed. The signal demodulation apparatus comprises a clock generation device, and a demodulation device. The clock generation device is arranged to generate a clock signal according to an inputting modulation signal. The demodulation device is arranged to demodulate the inputting modulation signal to generate a demodulation signal according to the clock signal, wherein a signal edge of the clock signal substantially aligns to a turning point of the inputting modulation signal.

According to a second embodiment, a signal demodulation method is disclosed. The signal demodulation method comprises the steps of: generating a clock signal according to an inputting modulation signal; and demodulating the inputting modulation signal to generate a demodulation signal according to the clock signal; wherein a signal edge of the clock signal substantially aligns to a turning point of the inputting modulation signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
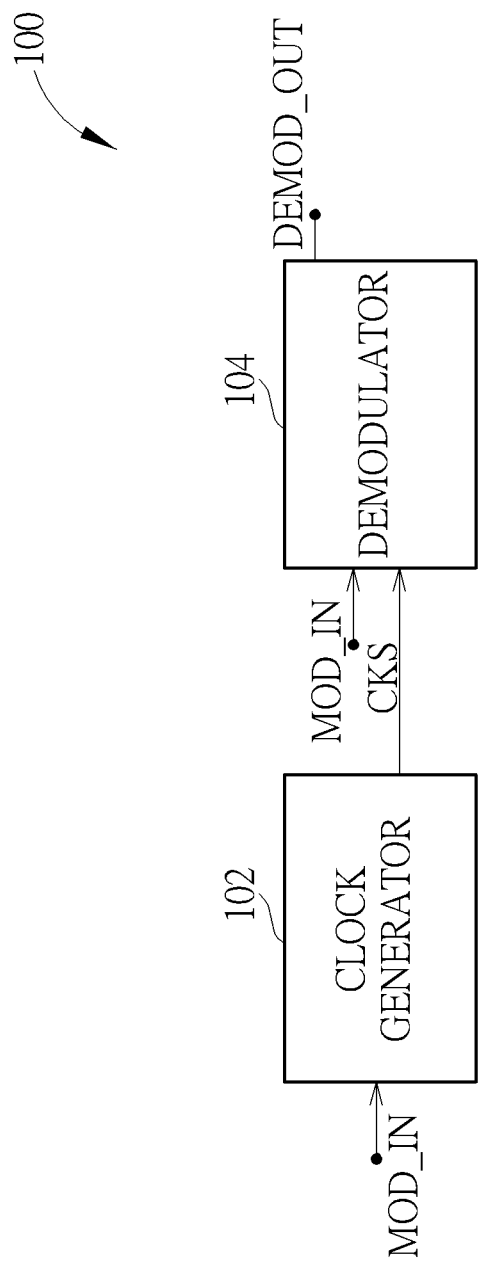
FIG. 1 is a diagram illustrating a signal demodulation apparatus according to an embodiment of the present invention.

Please refer to FIG. 1, which is a diagram illustrating a signal demodulation apparatus 100 according to an embodiment of the present invention. The signal demodulation apparatus 100 may be a demodulator used to demodulate a Near field communication (NFC) signal. The NFC signal may be an amplitude modulated signal having carrier frequency of 13.56 MHz. The data rate of the NFC signal may vary from 106 Kb/s to 6.78 Mb/s, and the modulation indices may vary from 10% to 100%. The signal demodulation apparatus 100 comprises a clock generation device 102 and a demodulation device 104. The clock generation device 102 is arranged to receive an inputting modulation signal MOD_IN. The inputting modulation signal MOD_IN may be received by an antenna (not shown), and the antenna is arranged to receive a wireless NFC signal from a NFC device or NFC host. The clock generation device 102 is arranged to generate a clock signal CKS according to the inputting modulation signal MOD_IN. The demodulation device 104 is coupled to the clock generation device 102. The demodulation device 104 is arranged to receive the clock signal CKS and the inputting modulation signal MOD_IN, and to demodulate the inputting modulation signal MOD_IN to generate a demodulation signal DEMOD_OUT according to the clock signal CKS.

According to the embodiment, a signal edge of the clock signal CKS substantially aligns to a turning point of the inputting modulation signal MOD_IN, in which the signal edge may be the rising edge or the falling edge of the clock signal CKS, and the turning point of the inputting modulation signal may be a peak (e.g. the maximum voltage) or a valley (e.g. the minimum voltage) of the inputting modulation signal MOD_IN. It should be noted that the signal edge of the clock signal CKS may precisely locate on the turning point of the inputting modulation signal MOD_IN or just close to the turning point of the inputting modulation signal MOD_IN.

Figure 2:
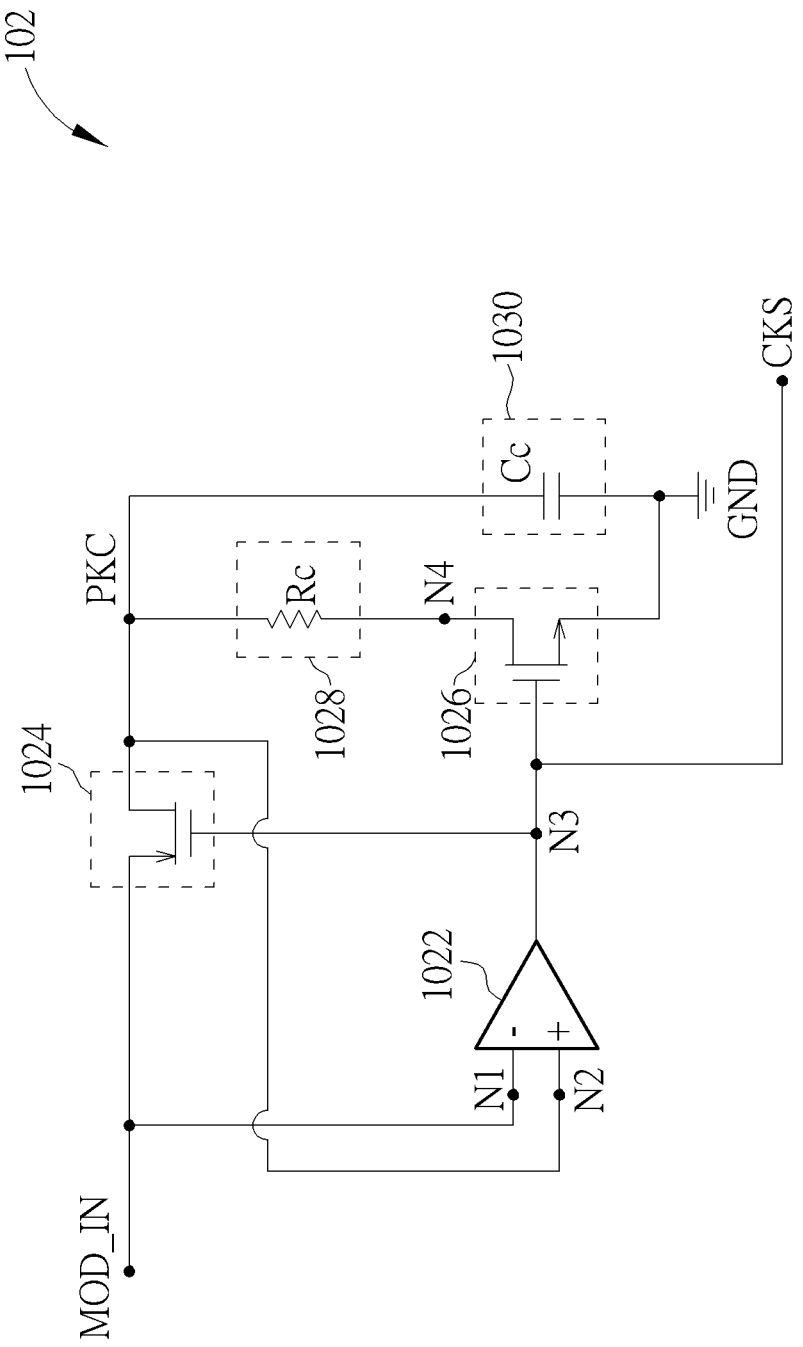
FIG. 2 is a diagram illustrating a clock generation device according to an embodiment of the present invention.

Please refer to FIG. 2, which is a diagram illustrating a clock generation device 102 according to an embodiment of the present invention. The clock generation device 102 comprises a comparator 1022, a first transistor 1024, a second transistor 1026, a resistor 1028, and a capacitor 1030. The comparator 1022 has a first input terminal N1 (e.g. the negative input terminal) for receiving the inputting modulation signal MOD_IN. The first transistor 1024 has a first connecting terminal (e.g. a source terminal) for receiving the inputting modulation signal MOD_IN, a second connecting terminal (e.g. a drain terminal) coupled to a second input terminal N2 (e.g. the positive input terminal) of the comparator 1022, and a controlling terminal coupled to an output terminal N3 of the comparator 1022. The first transistor 1024 may be a P-type field-effect transistor. The second transistor 1026 has a controlling terminal coupled to the output terminal N3 of the comparator 1022, and a first connecting terminal (e.g. a source terminal) coupled to a reference voltage, i.e. the ground voltage GND. The resistor 1028 has a resistance of $R_c$. The resistor 1028 has a first terminal coupled to a second connecting terminal (e.g. a drain terminal) N4 of the second transistor 1026, and a second terminal coupled to the second connecting terminal (i.e. N2) of the first transistor 1024. The second transistor 1026 may be an N-type field-effect transistor. The capacitor 1030 has a capacitance of $C_c$. The capacitor 1030 has a first terminal coupled to the second connecting terminal (i.e. N2) of the first transistor 1024, and a second terminal coupled to the reference voltage, i.e. the ground voltage GND. According to the embodiment, the clock signal CKS is a signal on the output terminal N3 of the comparator 1022.

Figure 3:
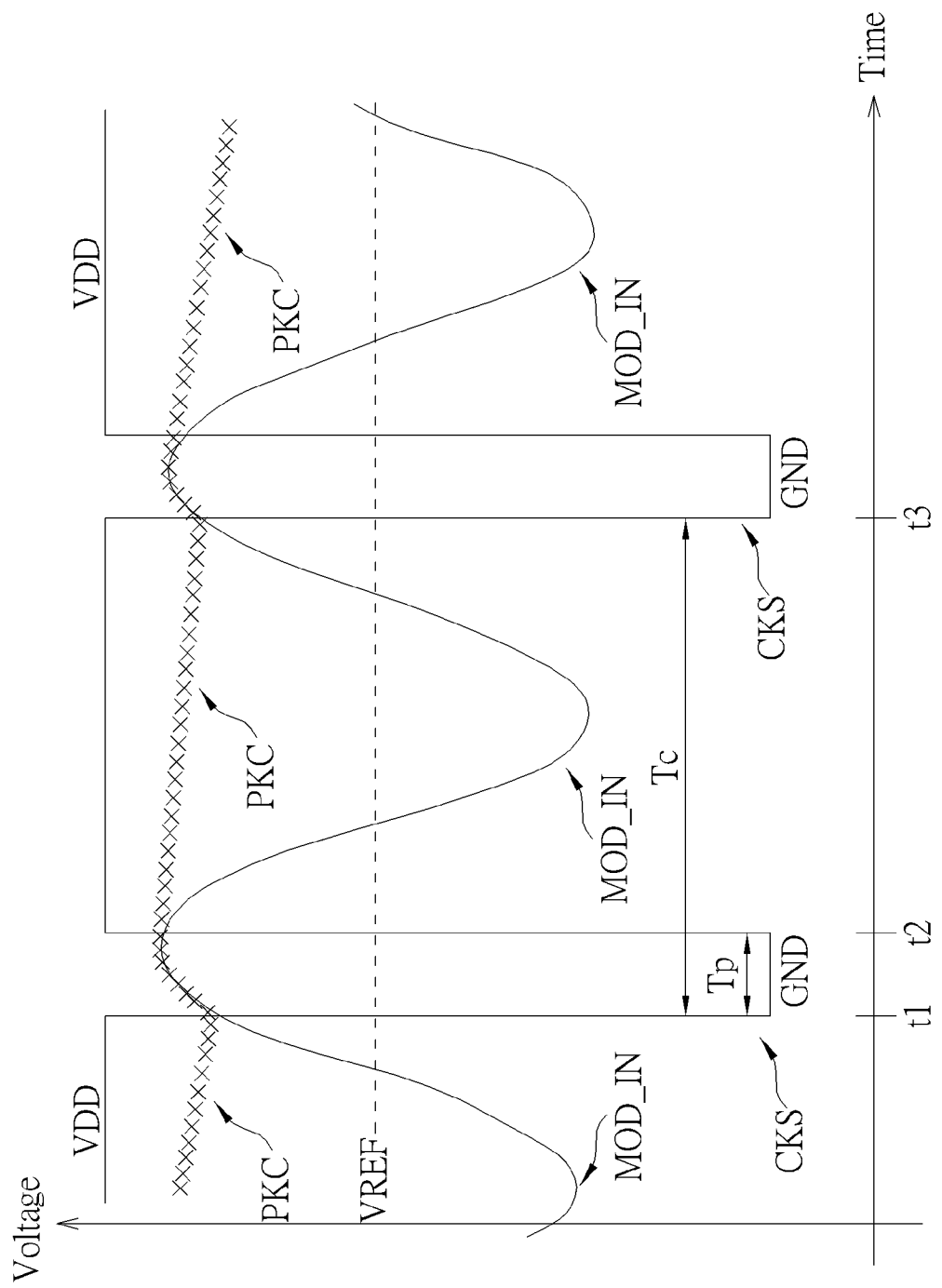
FIG. 3 is a timing diagram illustrating the waveforms of a clock signal, an inputting modulation signal, and a signal on the second input terminal of a comparator according to an embodiment of the present invention.

To illustrate the operation of the clock generation device 102, FIG. 3 is presented. FIG. 3 is a timing diagram illustrating the waveforms of the clock signal CKS, the inputting modulation signal MOD_IN, and a signal PKC on the second input terminal N2 of the comparator 1022 according to an embodiment of the present invention. When the inputting modulation signal MOD_IN is transmitted to the clock generation device 102, the first comparator 1022 compares the voltages on the first input terminal N1 and the second input terminal N2. It is assumed that the voltage on the first input terminal N1 is lower than the voltage on the second input terminal N2 before time t1. Therefore, the voltage on the output terminal N3 of the comparator 1022 is a high voltage level VDD before time t1. When the voltage on the output terminal N3 is the high voltage level VDD, the first transistor 1024 is turned off and the second transistor 1026 is turned on. This because the first transistor 1024 is P-type field-effect transistor and the second transistor 1026 is N-type field-effect transistor in this embodiment. Accordingly, the electric charges on the capacitor 1030 (i.e. the second input terminal N2) is discharged by the resistor 1028 such that the voltage (i.e. the signal PKC) on the second input terminal N2 decreases gradually before time t1.

Then, the voltage of the inputting modulation signal MOD_IN meets the voltage of the signal PKC at time t1, and after that, the comparator 1022 switches the voltage of the output terminal N3 to a low voltage level (e.g. GND) from the high voltage level VDD. When the voltage on the output terminal N3 is the low voltage level GND, the first transistor 1024 is turned on and the second transistor 1026 is turned off. As a result, the first transistor 1024 charges the capacitor 1030 after time t1 such that the voltage on the second input terminal N2 (i.e. the signal PKC) follows the voltage of the inputting modulation signal MOD_IN as shown in FIG. 3. More specifically, if the voltage of the inputting modulation signal MOD_IN keeps increasing after time t1, then the voltage on the second input terminal N2 will follow the voltage of the inputting modulation signal MOD_IN, which means that the voltage on the first input terminal N1 is higher than the voltage on the second input terminal N2. Therefore, the voltage on the output terminal N3 is kept on the low voltage level GND after time t1.

However, after the voltage of the inputting modulation signal MOD_IN reaches the maximum voltage, the voltage of the inputting modulation signal MOD_IN starts to decrease. At time t2, the voltage of the inputting modulation signal MOS_IN crosses the voltage of the signal PKC such that the voltage on the first input terminal N1 is lower than the voltage on the second input terminal. Then, the comparator 1022 switches the voltage on the output terminal N3 into the high voltage level VDD from the low voltage level GND, and the first transistor 1024 is turned off and the second transistor 1026 is turned on.

After time t2, the electric charges on the capacitor 1030 (i.e. the second input terminal N2) is again discharged by the resistor 1028 such that the voltage (i.e. the signal PKC) on the second input terminal N2 decreases gradually until the inputting modulation signal MOD_IN crosses the signal PKC at time t3. At time t3, the operation repeats.

According to FIG. 3, it is seen that a narrow pulse (i.e. the clock signal CKS), which is aligned/synchronized to the peak of the inputting modulation signal MOS_IN, is generated at the output terminal N3. In other words, the clock signal CKS having rising edges/falling edges aligned to the peaks of the inputting modulation signal MOD_IN is generated. It should be noted that a clock signal having rising edges/falling edges aligned to the valleys of the inputting modulation signal MOD_IN can also be generated after the appropriate modifications are made to the clock generation device 102. Those skilled in the art are appreciated to understand the modified clock generation device, thus the detailed description is omitted here for brevity. For example, one skilled in the art may change the first transistor 1024 to be an N-type field-effect transistor, and change the second transistor 1026 to be a P-type field-effect transistor.

According to the embodiment, the pulse width $T_p$ of the clock signal CKS can be expressed by the following equation (1):

$$T_p = \frac{T_c}{4} - \frac{T_c}{2\pi}\arcsin\left[\exp\left(-\frac{T_c - T_p}{R_c C_c}\right)\right].\quad(1)$$

$T_c$ is the period of the carrier of the inputting modulation signal MOD_IN. $R_c C_c$ is the time-constant of the RC circuit of the resistor 1028 and the capacitor 1030.

Figure 4:
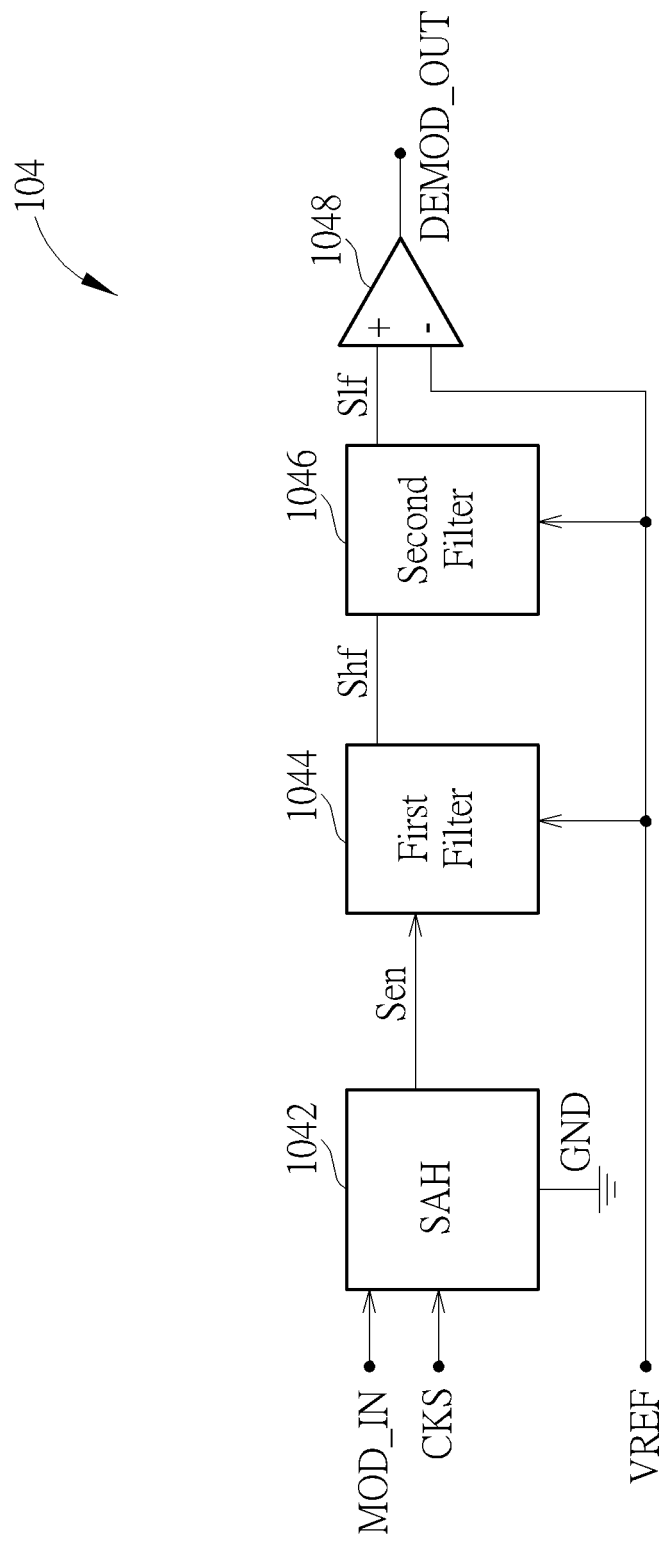
FIG. 4 is a diagram illustrating a demodulation device according to a first embodiment of the present invention.

Please refer to FIG. 4, which is a diagram illustrating the demodulation device 104 according to a first embodiment of the present invention. The demodulation device 104 comprises a sample and hold circuit (SAH) 1042, a first filter 1044, a second filter 1046, and a comparator 1048. The sample and hold circuit 1042 is arranged to sample the inputting modulation signal MOD_IN to generate an envelope signal Sen by using the clock signal CKS. The first filter 1044 is arranged to filter out a first signal component in the envelope signal Sen to generate a first filtered signal Shf. The second filter 1046 is arranged to filter out a second signal component in the envelope signal Sen or the first filtered signal Shf to generate a second filtered signal Slf. The comparator 1048 has a first input terminal+(i.e. the positive input terminal) for receiving the second filtered signal Slf, a second input terminal−(i.e. the negative input terminal) for receiving a reference voltage VREF, and an output terminal for outputting the demodulation signal DEMOD_OUT. The first filter 1044 and the second filter 1046 also receive the reference voltage VREF.

According to the embodiment, the first filter 1044 is a high-pass filter arranged to change a DC (Direct current) signal of the envelope signal Sen into the reference voltage VREF, and to accordingly generate the first filtered signal Shf. The second filter 1046 is a low-pass filter arranged to filter out a sampling noise of the first filtered signal Shf, which can be regarded as the sampling noise of the envelope signal Sen, and to accordingly generate the second filtered signal Slf.

Figure 5:
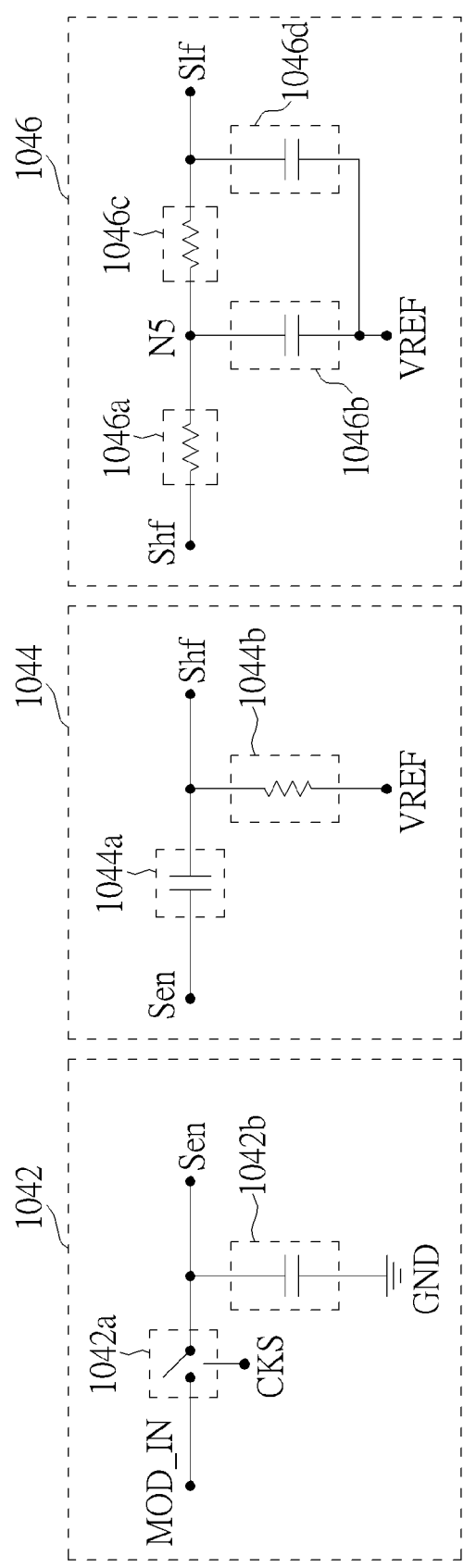
FIG. 5 is a diagram illustrating a sample and hold circuit, a first filter, and a second filter according to an embodiment of the present invention.

Please refer to FIG. 5, which is a diagram illustrating the sample and hold circuit 1042, the first filter 1044, and the second filter 1046 according to an embodiment of the present invention. The sample and hold circuit 1042 comprises a switch 1042a and a capacitor 1042b. The switch 1042a has a first connecting terminal receiving the inputting modulation signal MOD_IN, a controlling terminal receiving the clock signal CKS for selectively coupling the inputting modulation signal MOD_IN to a second connecting terminal of the switch 1042. The capacitor 1042b has a first terminal coupled the second connecting terminal of the switch 1042a, and a second terminal coupled to a reference voltage, i.e. the ground voltage GND. According to the embodiment, the envelope signal Sen is a signal on the first terminal of the capacitor 1042b.

The first filter 1044 comprises of a capacitor 1044a and a resistor 1044b. The capacitor 1044a has a first terminal receiving the envelope signal Sen. The resistor 1044b has a first terminal coupled to a second terminal of the capacitor 1044a, and a second terminal coupled to the reference voltage VREF. According to the embodiment, the first filtered signal Shf is a signal on the first terminal of the resistor 1044b.

The second filter 1046 comprises a first resistor 1046a, a first capacitor 1046b, a second resistor 1046c, and a second capacitor 1046d. The first resistor 1046a has a first terminal receiving the first filtered signal Shf. The first capacitor 1046b has a first terminal coupled to a second terminal N5 of the first resistor 1046a, and a second terminal coupled to the reference voltage VREF. The second resistor 1046c has a first terminal coupled to the second terminal N5 of the first resistor 1046a. The second capacitor 1046d has a first terminal coupled to a second terminal of the second resistor 1046c, and a second terminal coupled to the reference voltage VREF. According to the embodiment, the second filtered signal Slf is a signal on the first terminal of the second capacitor 1046d.

More specifically, when the demodulation device 104 receives the inputting modulation signal MOD_IN and the clock signal CKS, the sample and hold circuit 1042 uses the narrow pulses of the clock signal CKS to sample the voltage near the peak of the inputting modulation signal MOD_IN, and hold the voltage for the remaining of the carrier cycle time of the inputting modulation signal MOD_IN. Accordingly, when the amplitude of the carrier of the inputting modulation signal MOD_IN is high, the output of the sample and hold circuit 1042 is high, and when the amplitude of the carrier of the inputting modulation signal MOD_IN is low, the output of the sample and hold circuit 1042 is low. Therefore, the signal is already demodulated at the output of the sample and hold circuit 1042. However, the demodulated signal (i.e. the output of the sample and hold circuit 1042) has a high DC level and also contains some noise because of the sampling operation. Then, the high-pass filter (i.e. 1044) restores/changes the DC level of the demodulated signal to a predetermined reference level (i.e. VREF). The low-pass filter (i.e. 1046) removes the sampling noise from the demodulated signal. The cleaned-up and DC restored demodulated signal (i.e. Slf) is then fed to the non-inverting input (i.e. the positive input terminal +) of the comparator 1048 while the reference voltage VREF is fed to the inverting input (i.e. the negative input terminal −) of the comparator 1048. The signal at the output of the comparator 1048 is thus a rail-to-rail digital version of the demodulated signal.

Figure 6:
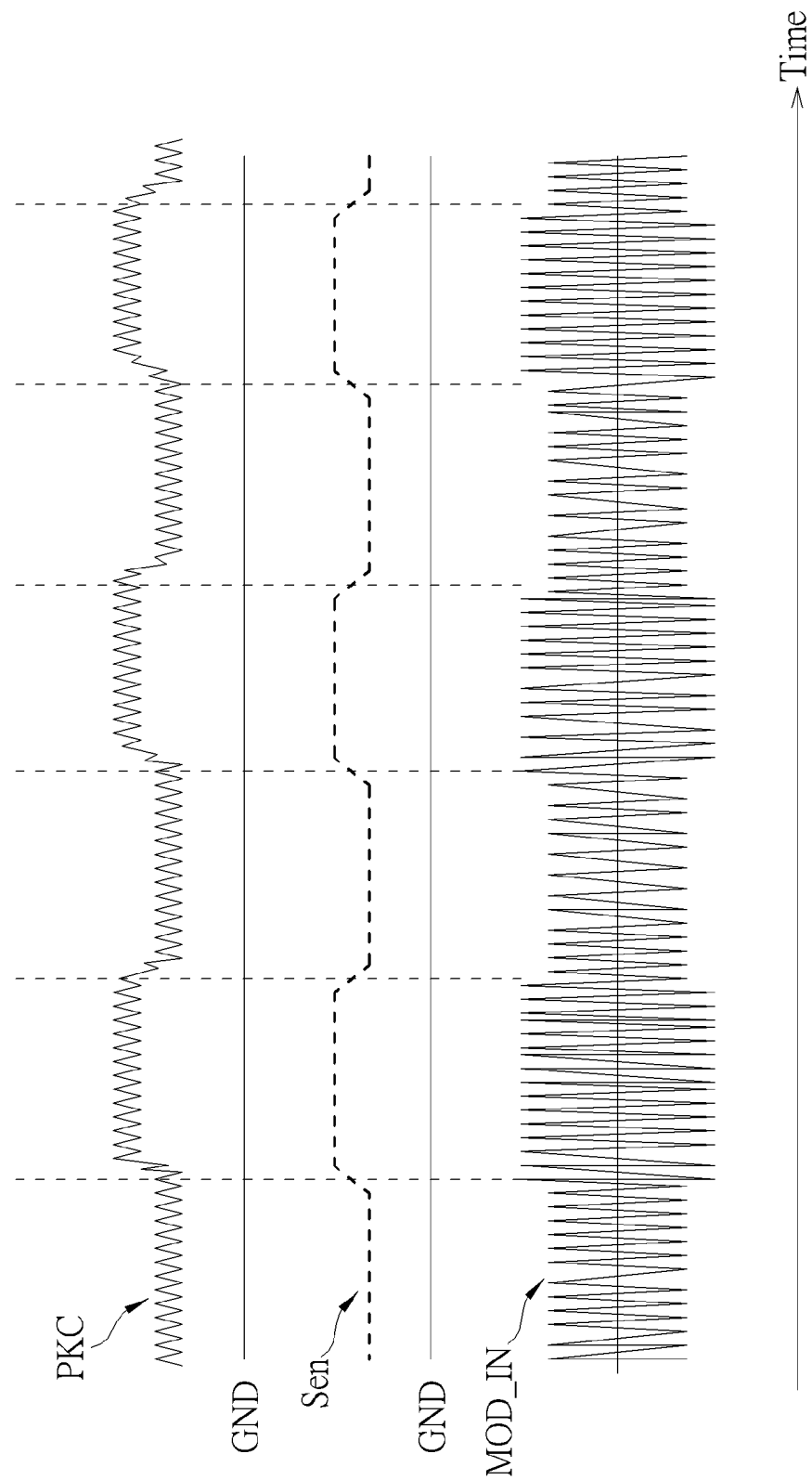
FIG. 6 is a timing diagram illustrating an inputting modulation signal, an envelope signal, and a signal according to an embodiment of the present invention.

Please refer to FIG. 6, which is a timing diagram illustrating the inputting modulation signal MOD_IN, the envelope signal Sen, and the signal PKC according to an embodiment of the present invention. The inputting modulation signal MOD_IN is an amplitude modulated signal. The sample and hold circuit 1042 uses the clock signal CKS to sample the voltage of the peak or near the peak of the inputting modulation signal MOD_IN, and to hold on the voltage of the peak or near the peak of the inputting modulation signal MOD_IN to generate the envelope signal Sen. Therefore, the envelope signal Sen substantially equals to the envelope of the inputting modulation signal MOD_IN. Moreover, the signal PKC is a triangle wave but has the similar envelope of the inputting modulation signal MOD_IN.

Figure 7:
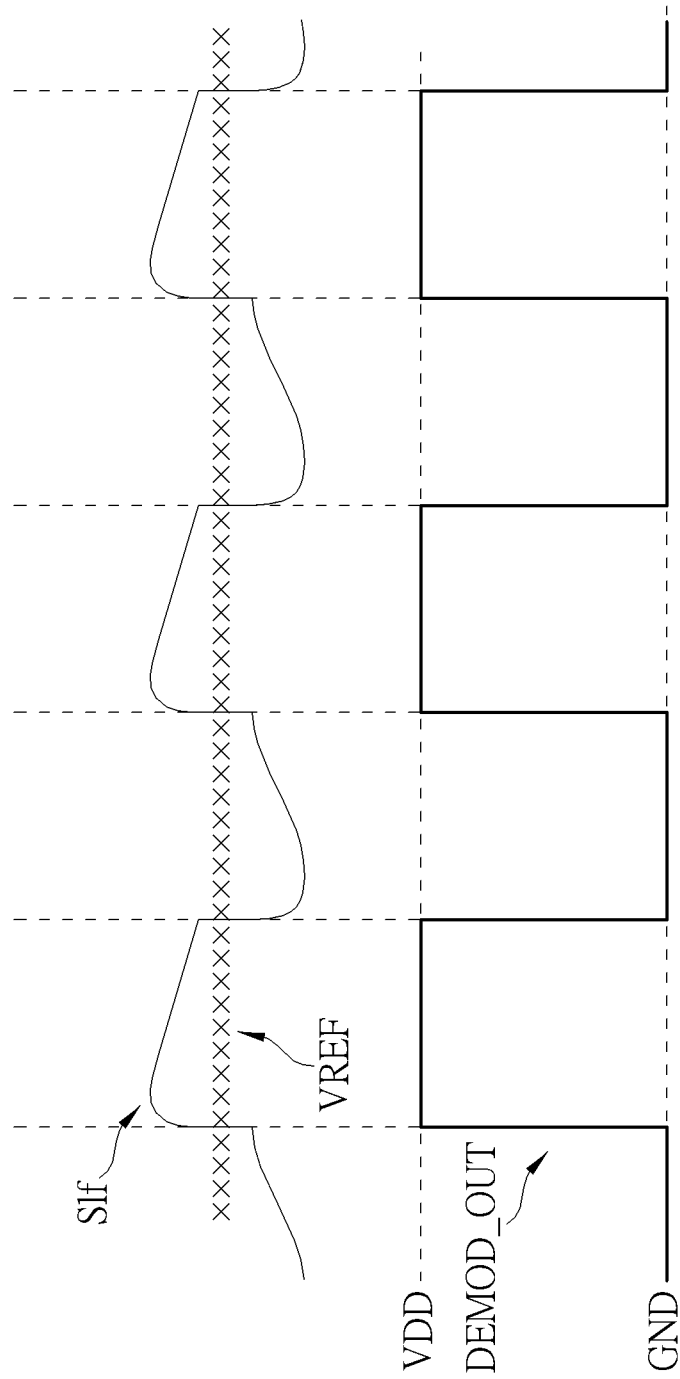
FIG. 7 is a timing diagram illustrating a second filtered signal, a reference voltage, and a demodulation signal according to an embodiment of the present invention.

Please refer to FIG. 7, which is a timing diagram illustrating the second filtered signal Slf, the reference voltage VREF, and the demodulation signal DEMOD_OUT according to an embodiment of the present invention. The reference voltage VREF is set in the middle voltage of the second filtered signal Slf because of DC restoration. As a result, when the voltage of the second filtered signal Slf is higher than the reference voltage VREF, the comparator 1048 outputs the high voltage level VDD, i.e. the supply voltage. When the voltage of the second filtered signal Slf is lower than the reference voltage VREF, the comparator 1048 outputs the low voltage level, i.e. the ground voltage GND. As a result, the comparator 1048 outputs a rail-to-rail square wave (i.e. the demodulation signal DEMOD_OUT) corresponding to the envelope of the inputting modulation signal MOD_IN.

Figure 8:
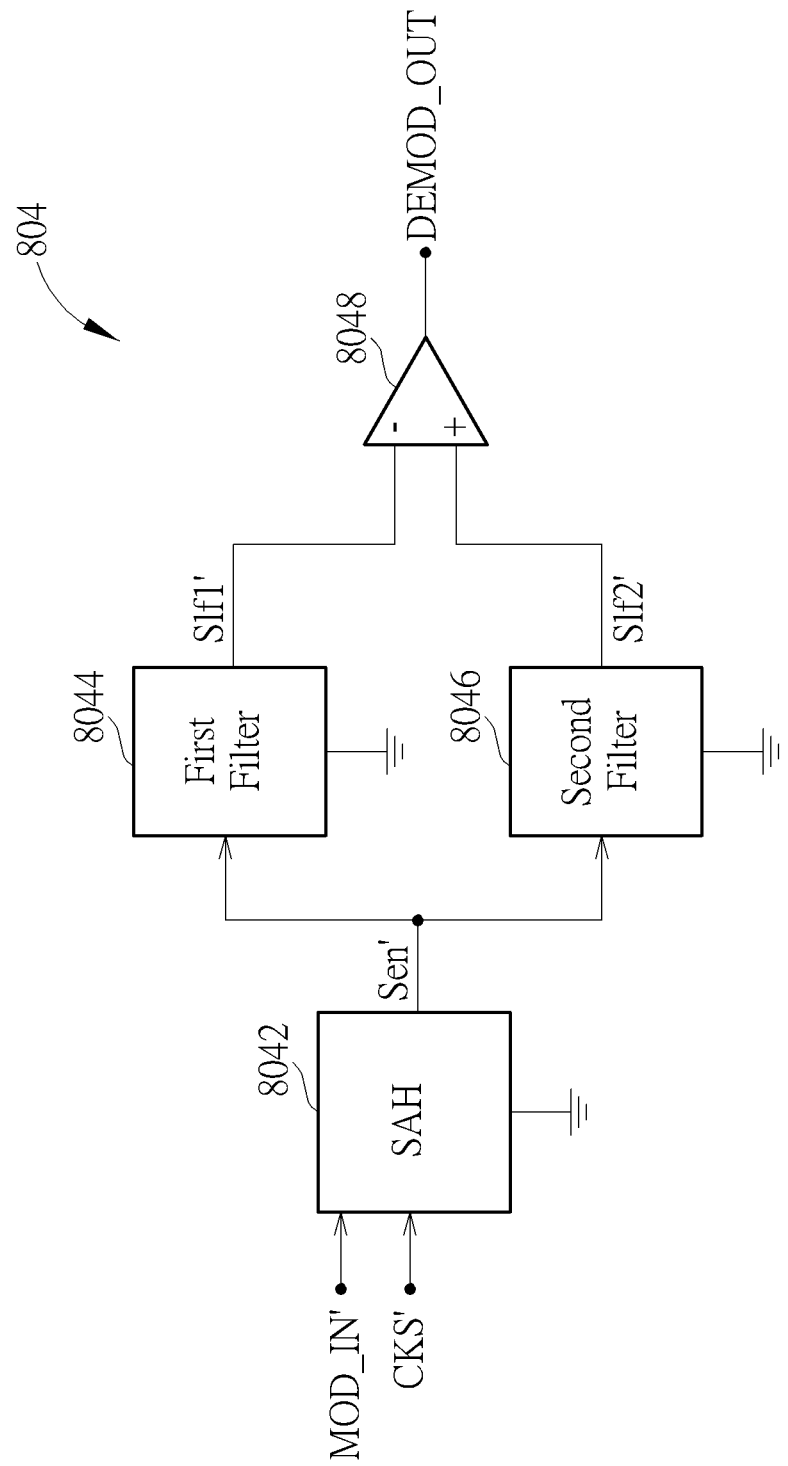
FIG. 8 is a diagram illustrating a demodulation device according to a second embodiment of the present invention.

Please refer to FIG. 8, which is a diagram illustrating a demodulation device 804 according to a second embodiment of the present invention. The demodulation device 804 comprises a sample and hold circuit (SAH) 8042, a first filter 8044, a second filter 8046, and a comparator 8048. The sample and hold circuit 8042 is arranged to sample the inputting modulation signal MOD_IN' to generate an envelope signal Sen' by using the clock signal CKS'. The first filter 8044 is arranged to filter out a first signal component in the envelope signal Sen' to generate a first filtered signal Slf1'. The second filter 8046 is arranged to filter out a second signal component in the envelope signal Sen' to generate a second filtered signal Slf2'. The comparator 8048 has a first input terminal (i.e. the negative input terminal −) for receiving the first filtered signal Slf1', a second input terminal (i.e. the positive input terminal +) for receiving the second filtered signal Slf2', and an output terminal for outputting the demodulation signal DEMOD_OUT'.

According to the embodiment, the first filter 8044 is a low-pass filter arranged to filter out an AC (Alternating current) signal of the envelope signal Sen', and to accordingly generate the first filtered signal Slf1'. The second filter 8046 is another low-pass filter arranged to filter out a sampling noise of the envelope signal Sen', and to accordingly generate the second filtered signal Slf2'. Therefore, the time constant of the first filter 8044 is larger than the time constant of the second filter 8046. More specifically, the first filter 8044 has a large time constant, and the second filter 8046 has a small time constant.

Figure 9:
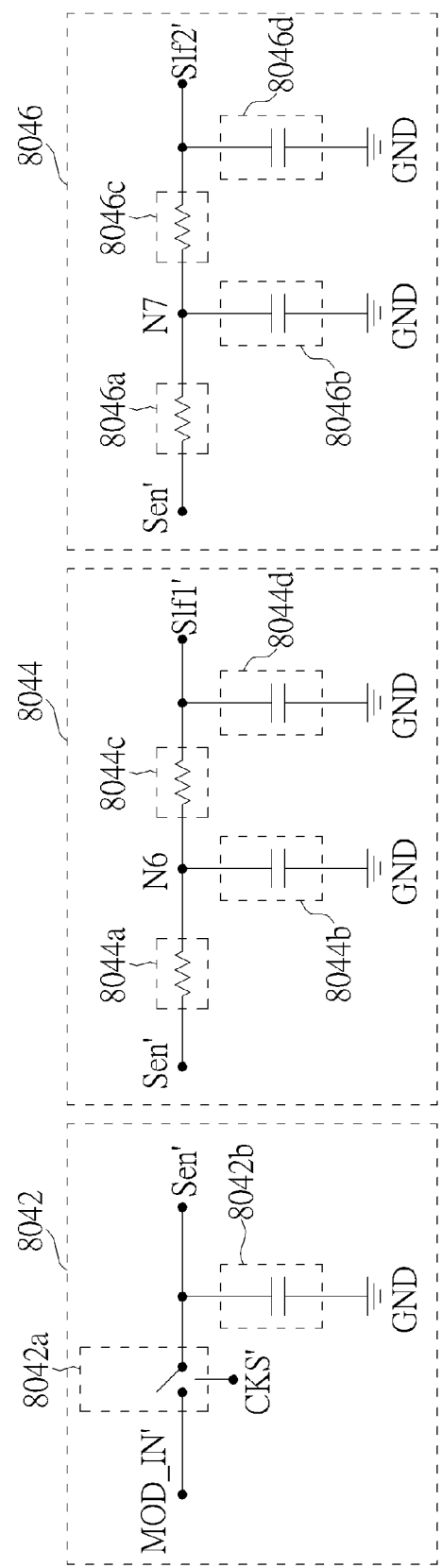
FIG. 9 is a diagram illustrating a sample and hold circuit, a first filter, and a second filter according to an embodiment of the present invention.

Please refer to FIG. 9, which is a diagram illustrating the sample and hold circuit 8042, the first filter 8044, and the second filter 8046 according to an embodiment of the present invention. The sample and hold circuit 8042 comprises a switch 8042a and a capacitor 8042b. The switch 8042a has a first connecting terminal receiving the inputting modulation signal MOD_IN', a controlling terminal receiving the clock signal CKS' for selectively coupling the inputting modulation signal MOD_IN' to a second connecting terminal of the switch 8042a. The capacitor 8042b has a first terminal coupled the second connecting terminal of the switch 8042a, and a second terminal coupled to a reference voltage, i.e. the ground voltage GND. According to the embodiment, the envelope signal Sen' is a signal on the first terminal of the capacitor 8042b.

The first filter 8044 comprises a first resistor 8044a, a first capacitor 8044b, a second resistor 8044c, and a second capacitor 8044d. The first resistor 8044a has a first terminal receiving the envelope signal Sen'. The first capacitor 8044b has a first terminal coupled to a second terminal N6 of the first resistor 8044a, and a second terminal coupled to a reference voltage, i.e. the ground voltage GND. The second resistor 8044c has a first terminal coupled to the second terminal N6 of the first resistor 8044a. The second capacitor 8044d has a first terminal coupled to a second terminal of the second resistor 8044c, and a second terminal coupled to the ground voltage GND. According to the embodiment, the first filtered signal Slf1' is a signal on the first terminal of the second capacitor 8044d.

The second filter 8046 comprises a first resistor 8046a, a first capacitor 8046b, a second resistor 8046c, and a second capacitor 8046d. The first resistor 8046a has a first terminal receiving the envelope signal Sen''. The first capacitor 8046b has a first terminal coupled to a second terminal N7 of the first resistor 8046a, and a second terminal coupled to the ground voltage GND. The second resistor 8046c has a first terminal coupled to the second terminal N7 of the first resistor 8046a. The second capacitor 8046d has a first terminal coupled to a second terminal of the second resistor 8046c, and a second terminal coupled to the ground voltage GND. According to the embodiment, the second filtered signal Slf2' is a signal on the first terminal of the second capacitor 8046d.

According to the embodiment, the first capacitor 8044b, the second capacitor 8044d, the first capacitor 8046b, and the second capacitor 8046d may have the same capacitance. Accordingly, the resistances of the first resistor 8044a and the second resistor 8044c need to be much larger than the resistances of the first resistor 8046a and the second resistor 8046c. For example, the resistances of the first resistor 8044a and the second resistor 8044c are 40 times larger than the resistances of the first resistor 8046a and the second resistor 8046c whereas the first capacitor 8044b, the second capacitor 8044d, the first capacitor 8046b, and the second capacitor 8046d have the same capacitance.

More specifically, the sample and hold circuit 8042 is similar to the above sample and hold circuit 1042. Therefore, the signal is already demodulated at the output of the sample and hold circuit 8042. In this embodiment, the demodulated signal (i.e. the output of the sample and hold circuit 8042) is fed to the large time-constant low-pass filter (i.e. 8044) for generating the average level of the demodulated signal. The demodulated signal (i.e. the output of the sample and hold circuit 8042) is also fed to the small time-constant low-pass filter (i.e. 8046) to remove the sampling noise from the demodulated signal. The output of the large time-constant low-pass filter is fed to the inverting input (i.e. the negative input terminal −) of the comparator 8048 while the output of the small time-constant low-pass filter is fed to the non-inverting input (i.e. the positive input terminal +) of the comparator 8048. The signal at the output of the comparator 8048 is thus a rail-to-rail digital version of the demodulated signal. It is noted that in this embodiment, no restoration of DC level of the demodulated signal is required.

Figure 10:
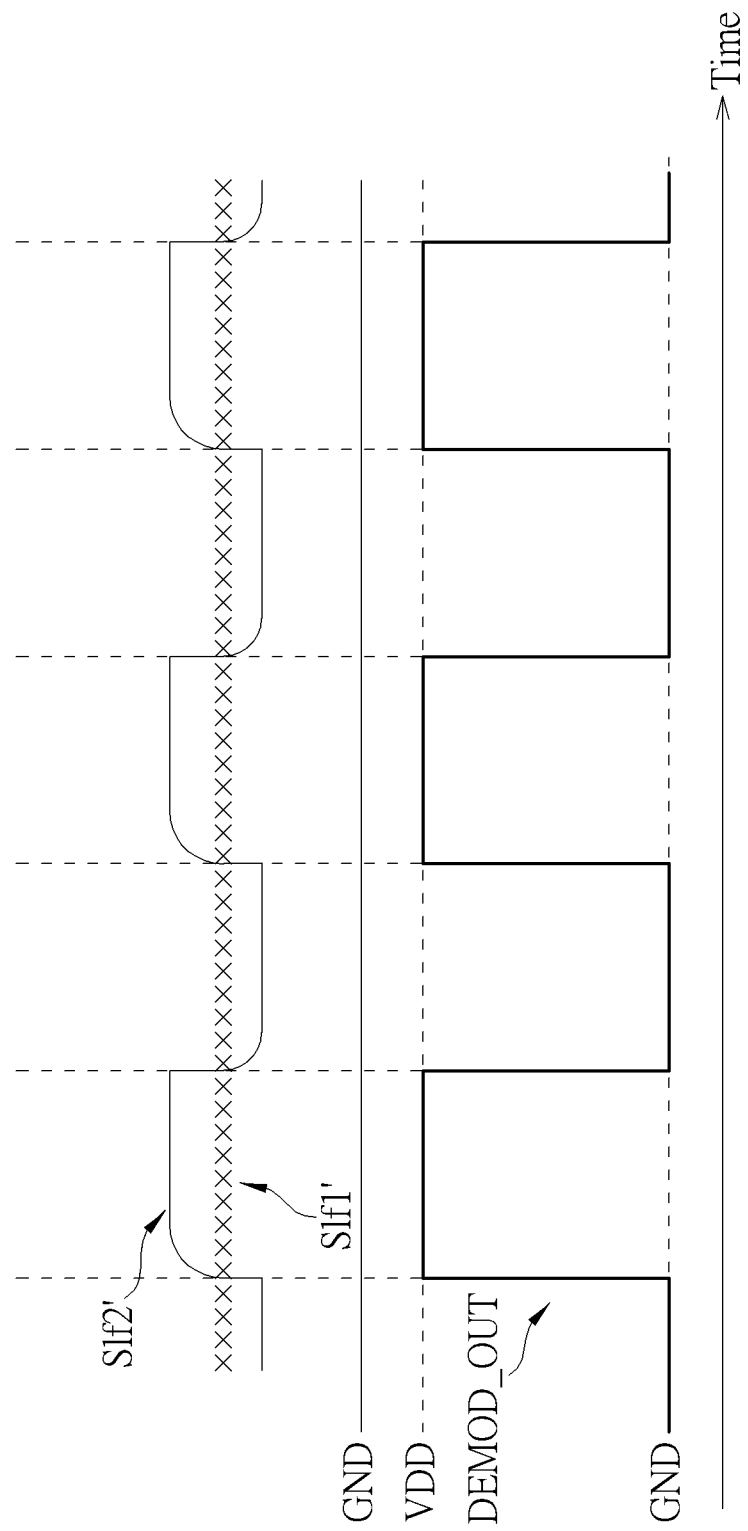
FIG. 10 is a timing diagram illustrating a first filtered signal, a second filtered signal, and a demodulation signal according to an embodiment of the present invention.

Please refer to FIG. 10, which is a timing diagram illustrating the first filtered signal Slf1', the second filtered signal Slf2', and the demodulation signal DEMOD_OUT' according to an embodiment of the present invention. The voltage of the first filtered signal Slf1' is in the middle of the second filtered signal Slf2'. As a result, when the voltage of the second filtered signal Slf2' is higher than the first filtered signal Slf1', the comparator 8048 outputs the high voltage level VDD, i.e. the supply voltage. When the voltage of the second filtered signal Slf2' is lower than the first filtered signal Slf1', the comparator 8048 outputs the low voltage level, i.e. the ground voltage GND. As a result, the comparator 8048 outputs a rail-to-rail square wave (i.e. the demodulation signal DEMOD_OUT') corresponding to the envelope of the inputting modulation signal MOD_IN'.

According to the above description, the demodulation apparatus 100 is an analog demodulator without using an analog-to-digital converter. Therefore, the proposed demodulation apparatus 100 is a simple, low cost, and low power consumption demodulator.

Figure 11:
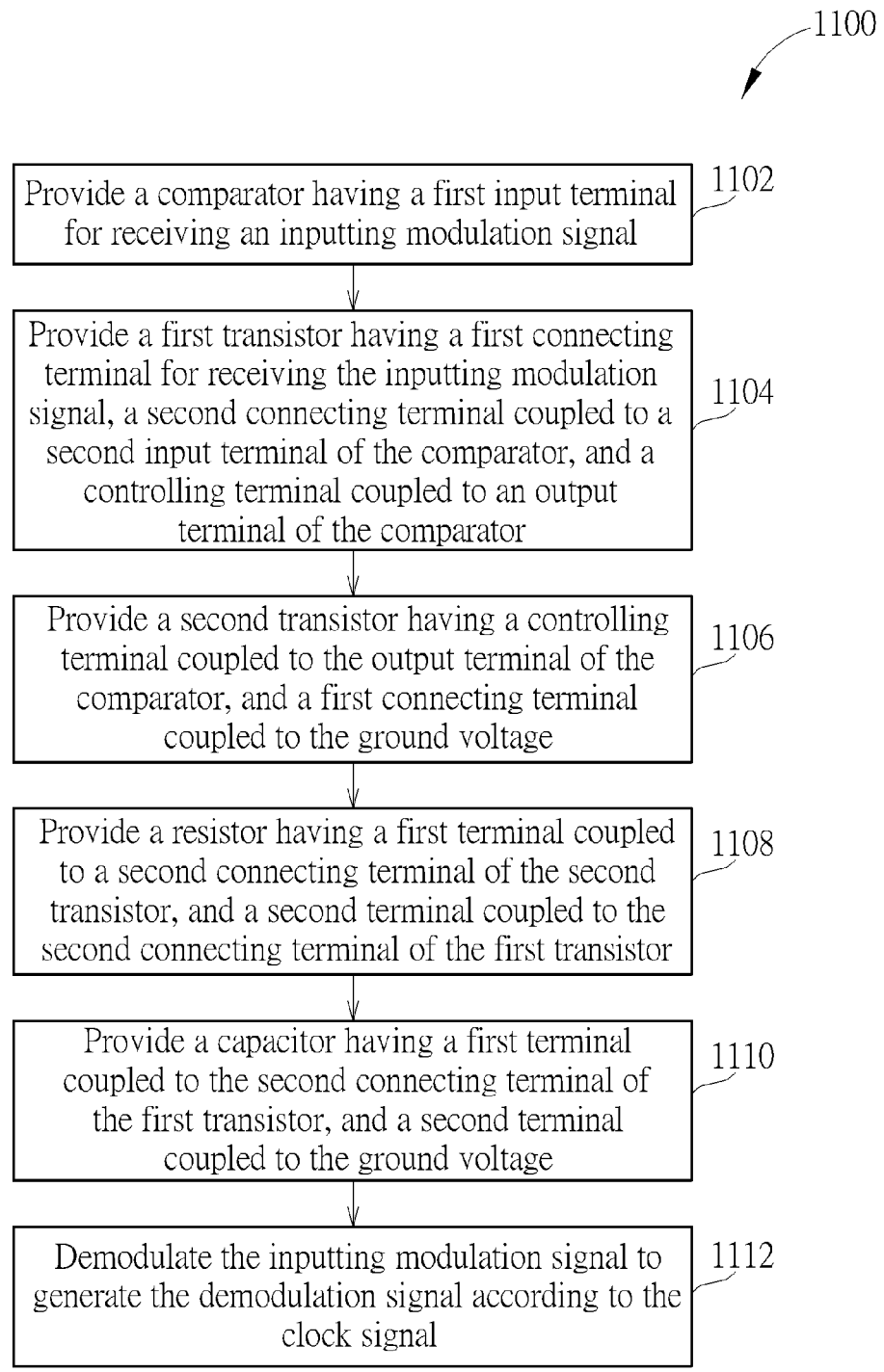
FIG. 11 is a flowchart illustrating a signal demodulation method according to an embodiment of the present invention.

In summary, the operation of the demodulation apparatus 100 can be summarized into the processes of FIG. 11. FIG. 11 is a flowchart illustrating a signal demodulation method 1100 according to an embodiment of the present invention. Provided that substantially the same result is achieved, the steps of the flowchart shown in FIG. 11 need not be in the exact order shown and need not be contiguous; that is, other steps can be intermediate. The signal demodulation method 1100 comprises the steps:

Step 1102: Provide the comparator 1022 having a first input terminal for receiving the inputting modulation signal MOD_IN;

Step 1104: Provide the first transistor 1024 having a first connecting terminal for receiving the inputting modulation signal MOD_IN, a second connecting terminal coupled to a second input terminal of the comparator 1022, and a controlling terminal coupled to an output terminal N3 of the comparator 1022;

Step 1106: Provide the second transistor 1026 having a controlling terminal coupled to the output terminal N3 of the comparator 1022, and a first connecting terminal coupled to the ground voltage GND;

Step 1108: Provide the resistor 1028 having a first terminal coupled to a second connecting terminal of the second transistor 1026, and a second terminal coupled to the second connecting terminal of the first transistor 1024;

Step 1110: Provide the capacitor 1030 having a first terminal coupled to the second connecting terminal of the first transistor 1024, and a second terminal coupled to the ground voltage GND, wherein the clock signal CKS is a signal on the output terminal N3 of the comparator 1022; and Step 1112: Demodulate the inputting modulation signal MOD_IN to generate the demodulation signal DEMOD_OUT according to the clock signal CKS, wherein a signal edge of the clock signal CKS substantially aligns to a turning point of the inputting modulation signal MOD_IN.

Briefly, the present demodulation apparatus and the related method applied an analog demodulation scheme to extract the envelope of an inputting NFC signal. Therefore, the proposed demodulation apparatus is a simple, low cost, and low power consumption demodulator.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal demodulation apparatus, comprising:
   a clock generation device, arranged to generate a clock signal according to an inputting modulation signal; and
   a demodulation device, arranged to demodulate the inputting modulation signal to generate a demodulation signal according to the clock signal;
   wherein a signal edge of the clock signal substantially aligns to a turning point of the inputting modulation signal;
   wherein the clock generation device comprises:
   a comparator, having a first input terminal for receiving the inputting modulation signal;
   a first transistor, having a first connecting terminal for receiving the inputting modulation signal, a second connecting terminal coupled to a second input terminal of the comparator, and a controlling terminal coupled to an output terminal of the comparator;
   a second transistor, having a controlling terminal coupled to the output terminal of the comparator, and a first connecting terminal coupled to a reference voltage;
   a resistor, having a first terminal coupled to a second connecting terminal of the second transistor, and a second terminal coupled to the second connecting terminal of the first transistor; and
   a capacitor, having a first terminal coupled to the second connecting terminal of the first transistor, and a second terminal coupled to the reference voltage;
   wherein the clock signal is a signal on the output terminal of the comparator.

2. The signal demodulation apparatus of claim 1, wherein the turning point of the inputting modulation signal is a peak or a valley of the inputting modulation signal.

3. The signal demodulation apparatus of claim 1, wherein the demodulation device comprises:
   a sample and hold circuit, arranged to sample the inputting modulation signal to generate an envelope signal by using the clock signal;
   a first filter, arranged to filter out a first signal component in the envelope signal to generate a first filtered signal;
   a second filter, arranged to filter out a second signal component in the envelope signal from the first filtered signal to generate a second filtered signal; and
   a comparator, having a first input terminal for receiving the second filtered signal, a second input terminal for receiving a first reference voltage, and an output terminal for outputting the demodulation signal.

4. The signal demodulation apparatus of claim 3, wherein the first filter is a high-pass filter arranged to change a DC (Direct current) signal of the envelope signal into the first reference voltage, and to accordingly generate the first filtered signal.

5. The signal demodulation apparatus of claim 3, wherein the second filter is a low-pass filter arranged to filter out a sampling noise of the envelope signal, and to accordingly generate the second filtered signal.

6. The signal demodulation apparatus of claim 3, wherein the sample and hold circuit comprises:
   a switch, having a first connecting terminal receiving the inputting modulation signal, a controlling terminal receiving the clock signal for selectively coupling the inputting modulation signal to a second connecting terminal of the switch; and
   a capacitor, having a first terminal coupled the second connecting terminal of the switch, and a second terminal coupled to a second reference voltage;
   wherein the envelope signal is a signal on the first terminal of the capacitor.

7. The signal demodulation apparatus of claim 3, wherein the first filter comprises:
   a capacitor, having a first terminal receiving the envelope signal; and
   a resistor, having a first terminal coupled to a second terminal of the capacitor, and a second terminal coupled to the first reference voltage;
   wherein the first filtered signal is a signal on the first terminal of the resistor.

8. The signal demodulation apparatus of claim 3, wherein the second filter comprises:
   a first resistor, having a first terminal receiving the first filtered signal;
   a first capacitor, having a first terminal coupled to a second terminal of the first resistor, and a second terminal coupled to the first reference voltage;
   a second resistor, having a first terminal coupled to the second terminal of the first resistor; and
   a second capacitor, having a first terminal coupled to a second terminal of the second resistor, and a second terminal coupled to the first reference voltage;
   wherein the second filtered signal is a signal on the first terminal of the second capacitor.

9. The signal demodulation apparatus of claim 1, wherein the demodulation device comprises:

a sample and hold circuit, arranged to sample the inputting modulation signal to generate an envelope signal by using the clock signal;

a first filter, arranged to filter out a first signal component in the envelope signal to generate a first filtered signal;

a second filter, arranged to filter out a second signal component in the envelope signal to generate a second filtered signal; and a comparator, having a first input terminal for receiving the first filtered signal, a second input terminal for receiving the second filtered signal, and an output terminal for outputting the demodulation signal.

10. The signal demodulation apparatus of claim 9, wherein a time constant of the first filter is substantially larger than the time constant of the second filter.

11. The signal demodulation apparatus of claim 9, wherein the first filter is a low-pass filter arranged to filter out an AC (Alternating current) signal of the envelope signal, and to accordingly generate the first filtered signal.

12. The signal demodulation apparatus of claim 9, wherein the second filter is a low-pass filter arranged to filter out a sampling noise of the envelope signal, and to accordingly generate the second filtered signal.

13. The signal demodulation apparatus of claim 9, wherein the sample and hold circuit comprises:
a switch, having a first connecting terminal receiving the inputting modulation signal, a controlling terminal receiving the clock signal for selectively coupling the inputting modulation signal to a second connecting terminal of the switch; and
a capacitor, having a first terminal coupled the second connecting terminal of the switch, and a second terminal coupled to a reference voltage;
wherein the envelope signal is a signal on the first terminal of the capacitor.

14. The signal demodulation apparatus of claim 9, wherein the first filter comprises:
a first resistor, having a first terminal receiving the envelope signal;
a first capacitor, having a first terminal coupled to a second terminal of the first resistor, and a second terminal coupled to a reference voltage;
a second resistor, having a first terminal coupled to the second terminal of the first resistor; and
a second capacitor, having a first terminal coupled to a second terminal of the second resistor, and a second terminal coupled to the reference voltage;
wherein the first filtered signal is a signal on the first terminal of the second capacitor.

15. The signal demodulation apparatus of claim 9, wherein the second filter comprises:
a first resistor, having a first terminal receiving the envelope signal;
a first capacitor, having a first terminal coupled to a second terminal of the first resistor, and a second terminal coupled to a reference voltage;
a second resistor, having a first terminal coupled to the second terminal of the first resistor; and
a second capacitor, having a first terminal coupled to a second terminal of the second resistor, and a second terminal coupled to the reference voltage;
wherein the second filtered signal is a signal on the first terminal of the second capacitor.

16. A signal demodulation method, comprising:
generating a clock signal according to an inputting modulation signal; and demodulating the inputting modulation signal to generate a demodulation signal according to the clock signal;
wherein a signal edge of the clock signal substantially aligns to a turning point of the inputting modulation signal;
wherein the step of generating the clock signal according to the inputting modulation signal comprises:
providing a comparator having a first input terminal for receiving the inputting modulation signal;
providing a first transistor having a first connecting terminal for receiving the inputting modulation signal, a second connecting terminal coupled to a second input terminal of the comparator, and a controlling terminal coupled to an output terminal of the comparator;
providing a second transistor having a controlling terminal coupled to the output terminal of the comparator, and a first connecting terminal coupled to a reference voltage;
providing a resistor having a first terminal coupled to a second connecting terminal of the second transistor, and a second terminal coupled to the second connecting terminal of the first transistor; and
providing a capacitor having a first terminal coupled to the second connecting terminal of the first transistor, and a second terminal coupled to the reference voltage;
wherein the clock signal is a signal on the output terminal of the comparator.

17. The signal demodulation method of claim 16, wherein the turning point of the inputting modulation signal is a peak or a valley of the inputting modulation signal.

18. The signal demodulation method of claim 16, wherein the step of demodulating the inputting modulation signal to generate the demodulation signal according to the clock signal comprises:
sampling the inputting modulation signal to generate an envelope signal by using the clock signal;
filtering out a first signal component in the envelope signal to generate a first filtered signal;
filtering out a second signal component in the envelope signal from the first filtered signal to generate a second filtered signal; and
comparing the second filtered signal and a first reference voltage to generate the demodulation signal.

19. The signal demodulation method of claim 18, wherein the step of filtering out the first signal component in the envelope signal to generate the first filtered signal comprises:
changing a DC (Direct current) signal of the envelope signal into the first reference voltage to accordingly generate the first filtered signal.

20. The signal demodulation method of claim 18, wherein the step of filtering out the second signal component in the envelope signal to generate the second filtered signal comprises:
filtering out a sampling noise of the envelope signal to accordingly generate the second filtered signal.

21. The signal demodulation method of claim 16, wherein the step of demodulating the inputting modulation signal to generate the demodulation signal according to the clock signal comprises:
sampling the inputting modulation signal to generate an envelope signal by using the clock signal;
filtering out a first signal component in the envelope signal to generate a first filtered signal;
filtering out a second signal component in the envelope signal to generate a second filtered signal; and comparing the first filtered signal and the second filtered signal to generate the demodulation signal.

22. The signal demodulation method of claim 21, wherein the step of filtering out the first signal component in the envelope signal to generate the first filtered signal comprises:
   filtering out an AC (Alternating current) signal of the envelope signal to accordingly generate the first filtered signal.

23. The signal demodulation method of claim 21, wherein the step of filtering out the second signal component in the envelope signal to generate the second filtered signal comprises:
   filtering out a sampling noise of the envelope signal to accordingly generate the second filtered signal.

* * * * *